United States Patent

Harmon

[11] Patent Number: 5,555,843
[45] Date of Patent: Sep. 17, 1996

[54] MULTI-PURPOSE FEEDER

[76] Inventor: William D. Harmon, 781 Corinth Dr., Jonesboro, Ga. 30236

[21] Appl. No.: 371,016

[22] Filed: Jan. 11, 1995

Related U.S. Application Data

[63] Continuation-in-part of Ser. No. 17,386, Jan. 12, 1994.

[51] Int. Cl.$^6$ ........................................ A01K 39/01
[52] U.S. Cl. ........................ 119/57.8; 119/70; 119/57.91
[58] Field of Search ............................... 119/51.04, 52.2, 119/57.8, 57.91, 70

[56] References Cited

U.S. PATENT DOCUMENTS

| | | | |
|---|---|---|---|
| D. 307,086 | 4/1990 | Van Marcki et al. | D30/121 |
| 1,498,220 | 6/1924 | Winkler | 119/70 |
| 1,518,018 | 12/1924 | Thompson | 119/77 |
| 3,276,630 | 10/1966 | Welch | 119/51.04 |
| 3,688,744 | 9/1972 | Kaplan | 119/51.04 |
| 3,741,163 | 6/1973 | Bush | 119/51.04 |
| 4,565,159 | 1/1986 | Sweeney | 119/57.91 |
| 4,712,512 | 12/1987 | Schreib et al. | 119/52.2 |
| 5,105,766 | 4/1992 | Montgomery | 119/57.91 |
| 5,143,289 | 9/1992 | Gresham et al. | 119/57.91 |
| 5,215,039 | 6/1993 | Bescherer | 119/57.8 |
| 5,233,941 | 8/1993 | Ayliffe, Jr. et al. | 119/57.91 |
| 5,307,760 | 5/1994 | Madigan et al. | 119/57.9 |
| 5,333,572 | 8/1994 | Nott | 119/57.91 |
| 5,452,682 | 9/1995 | Bescherer et al. | 119/57.8 |

FOREIGN PATENT DOCUMENTS

| | | | |
|---|---|---|---|
| 3150934 | 7/1983 | Germany | D30/121 |
| 171929 | 12/1921 | United Kingdom | 119/70 |

OTHER PUBLICATIONS

Applicant's Disclosure of a Striker-Type Animal Feeder.

Primary Examiner—Robert P. Swiatek
Attorney, Agent, or Firm—Louis T. Isaf, P.C.

[57] ABSTRACT

A striker-feeder includes a bucket having a bottom panel defining a hole therethrough, and a primary tube extends through the hole. A capped end of the primary tube is within the bucket and defines a pair of diametrically opposed apertures therethrough. A pivot tube extends through the diametrically opposed apertures and abuts the bottom panel of the bucket to pivotally connect the primary tube to the bucket. When an animal bumps the primary tube, feed within the bucket falls through the hole in the bottom of the bucket. The end of the primary tube that is extended from the bottom of the bucket is fitted with a threaded fitting. An extended striker configuration is achieved by threadedly connecting an extension tube to the end of the primary tube that is threaded. A feed rod configuration is achieved by inverting the primary tube such that the fitting end of the primary tube is within the bucket, the primary tube extends through the hole in the bottom of the bucket, and the capped end of the primary tube is disposed below the bottom of the bucket. The fitting is too large to pass through the hole in the bottom of the bucket and thereby secures the tube to the bucket such that feed in the bucket flows through the internal passage of the primary tube and is accessible at multiple pairs of diametrically opposed apertures defined by the primary tube proximate to the capped end thereof.

8 Claims, 3 Drawing Sheets

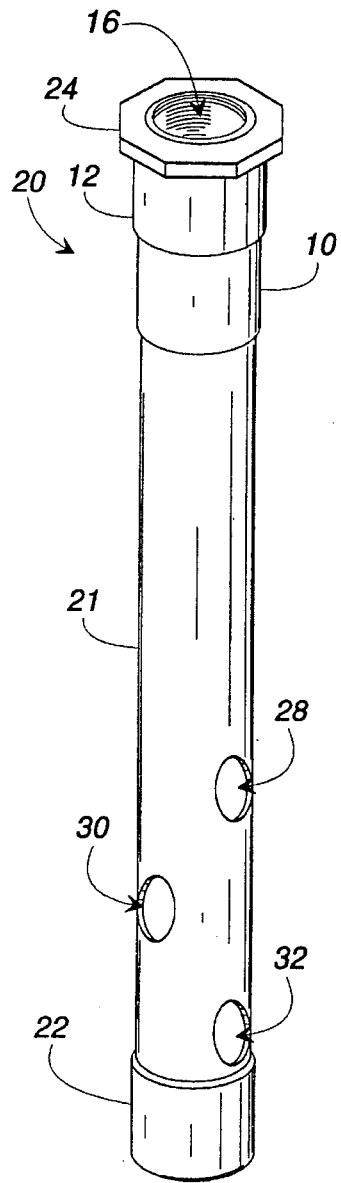
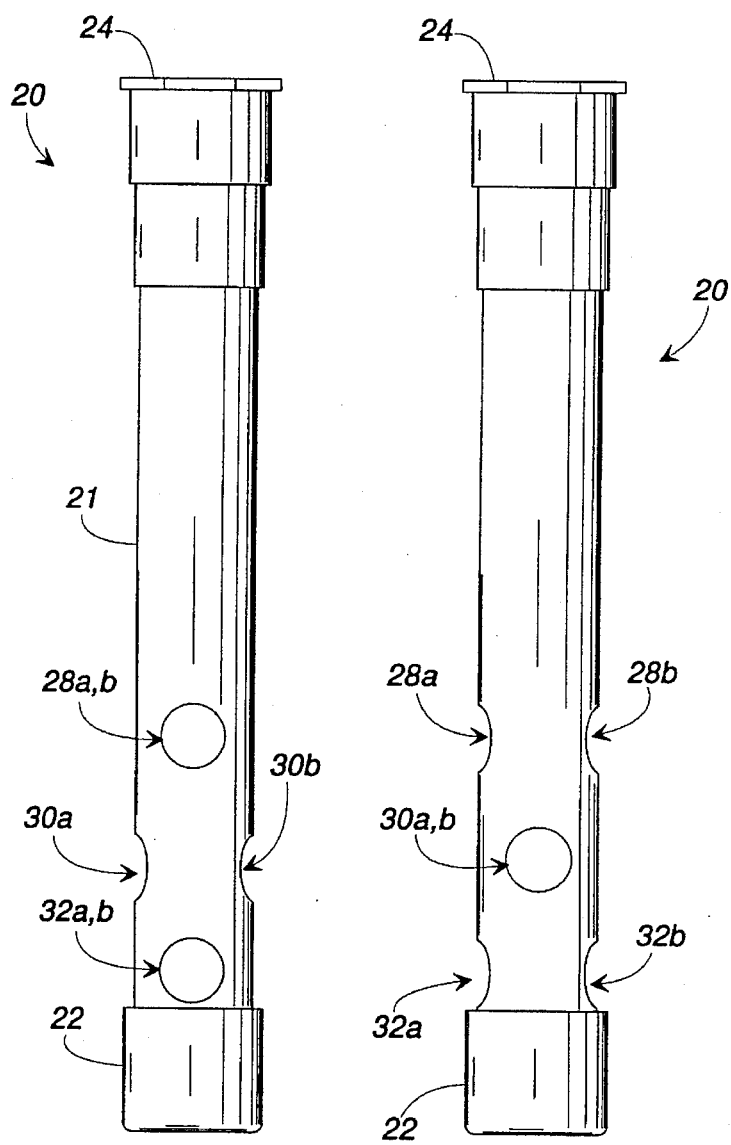
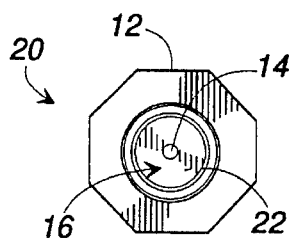
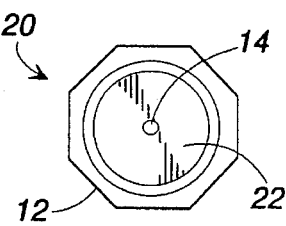

5,555,843

MULTI-PURPOSE FEEDER

CROSS-REFERENCE TO RELATED APPLICATIONS

This application is a continuation-in-part of application Ser. No. 29/017,386 which was filed Jan. 12, 1994.

BACKGROUND OF THE INVENTION

The present invention relates generally to the field of supplying food and more particularly to the field of animal feeders.

A variety of animal feeders are on the market today. However, most conventional feeders are limited in that they do not adapt to the feeding needs of a variety of different species. For example, a conventional striker-type feeder includes a bucket having a bottom panel defining a hole therethrough, and that feeder further includes a primary tube that extends through the hole in the bottom of the bucket. One end of the primary tube is within the bucket and defines a pair of diametrically opposed apertures therethrough. A pivot tube extends through the diametrically opposed apertures and abuts the bottom panel of the bucket to pivotally connect the primary tube to the bucket. The diameter of the primary tube is slightly less than the diameter of the hole in the bottom panel of the bucket such that the primary tube pivots with respect to the bucket. The bucket is suspended such that an animal is capable of bumping at the primary tube so that feed within the bucket falls through the hole in the bottom of the bucket. A non-threaded fitting is attached to the end of the primary tube that is extended from the bucket. The utility of the above-mentioned feeder is limited due to the fact that it is capable of functioning only as a "striker".

SUMMARY OF THE INVENTION

Briefly described, the present invention provides a method and apparatus for feeding animals. The present invention provides a feeder having multiple configurations. More particularly, the present invention provides a feeder that, for example and not limitation, is capable of functioning in one configuration as a striker in the same general manner as discussed above. The feeder of the present invention is also constructed and arranged to function in other configurations as an extended striker and a feed rod.

Once the apparatus of the present invention is in a striker configuration similar to that discussed above, an extended striker configuration is preferably achieved by threadedly connecting an extension tube to the end of the primary tube that is extended from the bottom of the bucket. In accordance with the preferred embodiments of the present invention, and while the feeder is in the striker configuration, the end of the primary tube that is within the bucket is capped and the end of the primary tube that is extended from the bottom of the bucket is fitted with a threaded fitting.

In accordance with the preferred embodiments of the present invention, the feed rod configuration of the present invention is achieved by removing the pivot tube from the primary tube and inverting the primary tube such that the fitting end of the primary tube is within the bucket, the primary tube extends through the hole in the bottom of the bucket, and the capped end of the primary tube is disposed below the bottom of the bucket. The fitting is too large to pass through the hole in the bottom of the bucket and thereby secures the tube to the bucket such that feed in the bucket flows into the internal passage of the primary tube and is accessible at multiple pairs of diametrically opposed apertures defined by the primary tube proximate to the capped end thereof. The cap preferably defines a drainage hole therethrough, and the pivot tube is, in accordance with one embodiment, placed through one of the pairs of apertures to serve, for example, as a perch.

It is therefore an object of the present invention to provide a multi-purpose feeder and methods for using the multi-purpose feeder.

Another object of the present invention is to provide a striker that is also capable of functioning as a feed rod.

Yet another object of the present invention is to provide a feeder that adapts to feed a variety of animals.

Other objects, features and advantages of the present invention will become apparent upon reading and understanding this specification, taken in conjunction with the accompanying drawings.

BRIEF DESCRIPTION OF THE DRAWINGS

FIG. 1 is a perspective view of a primary tube assembly in accordance with the preferred embodiments of the present invention.

FIGS. 2 and 3 are front and side elevational views of the tube assembly of FIG. 1.

FIGS. 4 and 5 are top and bottom plan views, respectively, of the tube assembly of FIG. 1.

DETAILED DESCRIPTION OF THE PREFERRED EMBODIMENTS

Figures 9, 10:
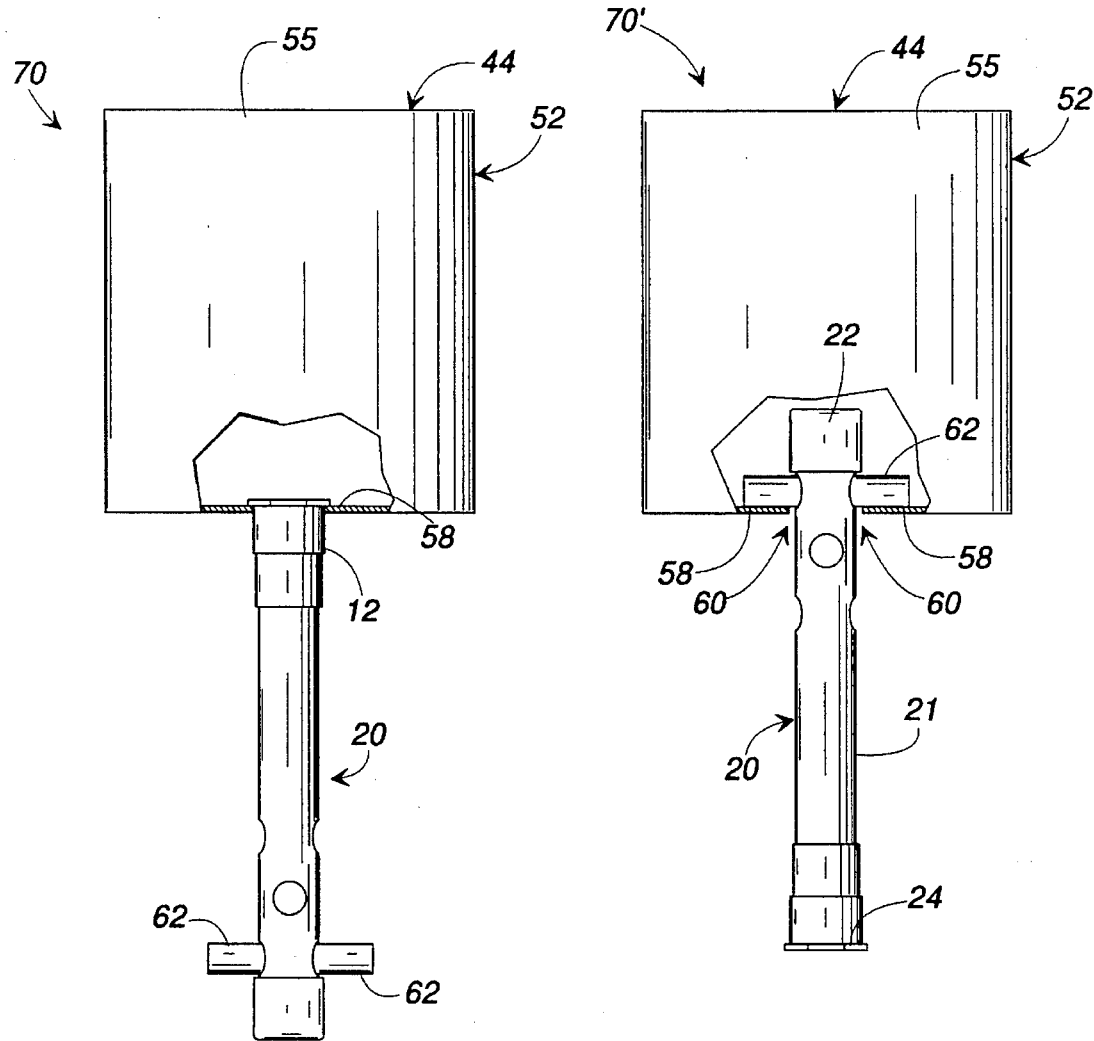
FIG. 9 is a side, cut-away view of a feeder in a feed-rod configuration, in accordance with a first preferred embodiment of the present invention.
FIG. 10 is a side, cut-away view of the feeder of FIG. 9 in a striker configuration, in accordance with a second preferred embodiment of the present invention.

Referring now in greater detail to the drawings, in which like numerals represent like components throughout the several views, FIG. 1 is a perspective view of a primary tube assembly 20 component of a feeder 70,70' (FIGS. 9 and 10). The tube assembly 20 includes a tube 21, a cap 22 at one end of the tube 21, an expansion fitting 10 at the opposite end of the tube 21, and a female threaded fitting 12 connected to the expansion fitting 10. The threaded fitting includes an annular flange 24. The tube assembly 20 defines an internal passage 16 extending between the opposite ends thereof. Access to the internal passage 16 is somewhat precluded at one end of the tube assembly 20 by the cap 22, but the cap 22 does not totally preclude access to the internal passage 16 because the cap 22 defines an aperture 14 (FIGS. 4 and 5) therethrough. The passage 16 is accessible at the fitting 12 end of the tube assembly 20, and threads 26 are defined by the internal surface of the threaded fitting 12. Referring additionally to FIGS. 2 and 3, which are front and side elevational views of the tube assembly 20, respectively, (the sides opposite being a mirror image) the tube 21 defines a first pair of diametrically opposed holes 28a,b, a second pair of diametrically opposed holes 30a,b, and a third pair of diametrically opposed holes 32a,b that are in communication with the passage 16 (FIG. 1) that extends through the tube assembly 20. FIGS. 4 and 5 are top and bottom plan views, respectively, of the tube assembly 20 which show the aperture 14 in the cap 22.

Figures 6, 7, 8:
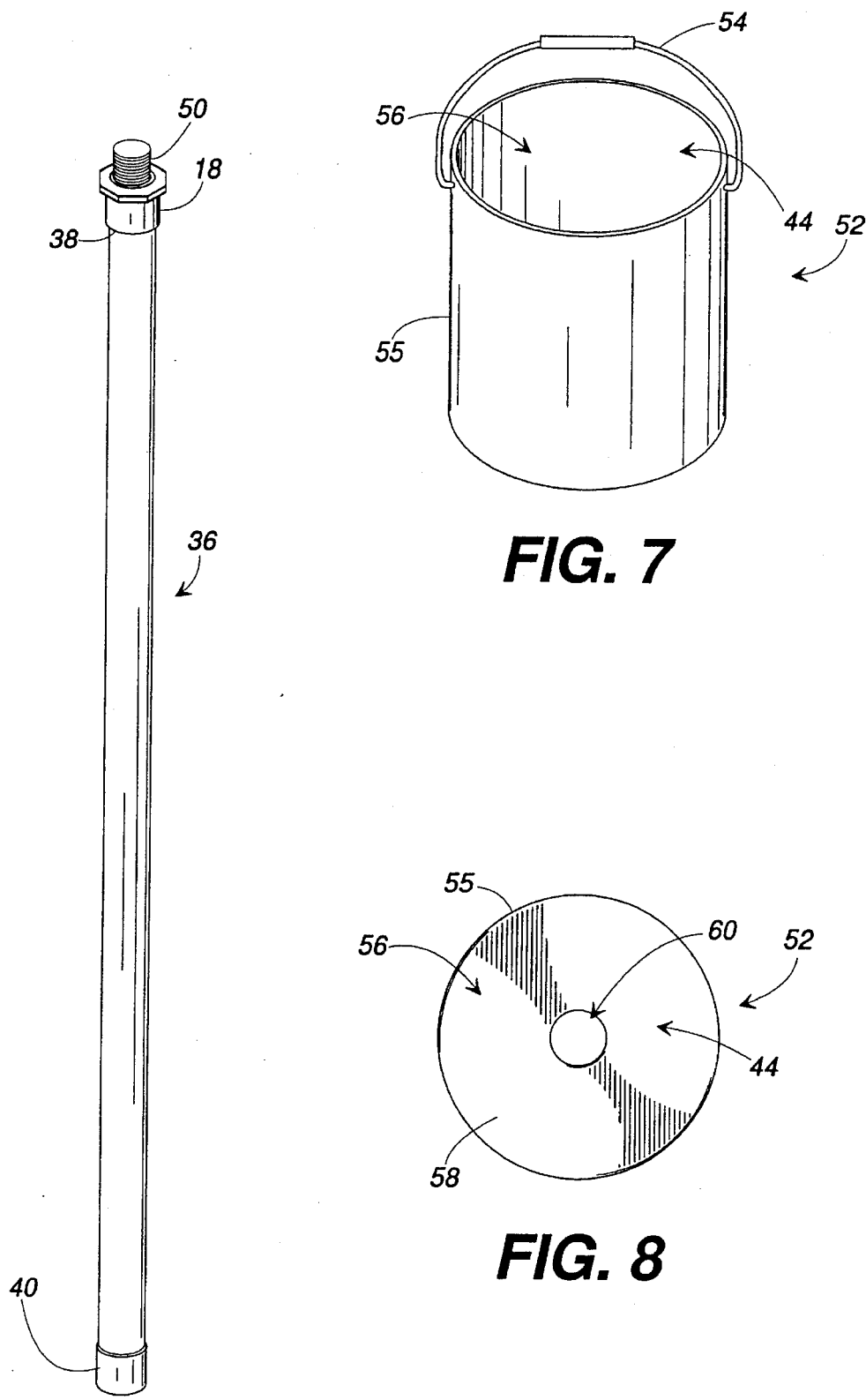
FIG. 6 is a perspective view of an extension tube.
FIGS. 7 and 8 are perspective and cut-away top views, respectively, of a bucket, in accordance with the preferred embodiments of the present invention.

FIG. 6 is a perspective view of an extension tube 36 that is acceptably incorporated into the feeder 70' (FIG. 10), in accordance with a first alternate embodiment of the present invention. The extension tube 36 includes a top end 38 to which a tubular, male threaded fitting 18 is connected and a bottom end 40 that is capped. The threaded fitting 18 defines threads 50. The tube 21 (FIGS. 1–3) and tube 36 are preferably one inch, schedule 40, polyvinyl chloride tubing.

FIGS. 7 and 8 are perspective and top, cut-away views, respectively, of a feed reservoir in the form of a bucket 52, which bucket 52 is part of the feeders 70,70' (FIGS. 9 and 10). Referring to FIG. 7, the bucket 52 preferably includes a handle 54 and a side-wall 55 that defines a top opening 44 and cooperates with a bottom panel 58 (FIG. 8) to define a chamber 56 for storing animal feed. Referring to FIG. 8, in which the handle 54 (FIG. 7) has been cut-away, the bottom panel 58 defines a hole 60 therethrough. The bucket 52 is preferably a five gallon bucket.

FIG. 9 is a side, cut-away view of the feeder 70 in a feed-rod configuration, in accordance with a first preferred embodiment of the present invention. A portion of the side-wall 55 of the bucket 52 is cut-away in FIG. 9 to show that the threaded fitting 12 is occupying the hole 60 (FIG. 8). In accordance with the first preferred embodiment of the present invention, the periphery of the flange 24 extends beyond the periphery of the hole 60 and securely abuts the bottom panel 58. Thus, in accordance with the first preferred embodiment of the present invention, animal feed within the bucket 52 becomes accessible to animals by passing into the internal passage 16 (FIG. 1) of the tube assembly 20 such that the animal feed is accessible at the holes 28a,b;30a,b (FIGS. 1–3). In accordance with the first preferred embodiment of the present invention, a single elongated tube 62 is extending through the holes 32a,b (FIGS. 1–3), and the tube 62 preferably functions, for example, as a perch so that song-birds may rest thereon while accessing animal feed through the holes 28a,b;30a,b (FIGS. 1–3). In accordance with the first preferred embodiment of the present invention, the feeder 70 is acceptably suspended such that it is distant from the ground. In accordance with a first alternate embodiment of the present invention, the tube 62 is not employed within (i.e., is withdrawn from) the holes 32a,b such that feed is accessible at each of the holes 28a,b;30a,b;32a,b. In this configuration, for example, the feeder is capable of being suspended closer to the ground such that ground-feeding birds, such as turkeys, might be able to stand on the ground and access the holes 28a,b;30a,b;32a,b.

FIG. 10 is a side, cut-away view of the feeder 70' in a striker configuration, in accordance with a second preferred embodiment of the present invention. The apparatus of the present invention is acceptably, and readily, converted between the feed-rod configuration (FIG. 9) and the striker configuration (FIG. 10) as follows: The tube 62 is withdrawn from the holes 32a,b, and the tube assembly 20 is withdrawn from the bucket 52 through the opening 44 (FIGS. 7 and 8) at the top of the bucket 52. Then, the cap 22 end of the robe assembly 20 is inserted, from below, through the hole 60 in the bottom of the bucket 52 so that the holes 32a,b (FIGS. 1–3) are disposed within the bucket 52 and the flange 24 is below and outside of the bucket 52. Then, the tube 62 is preferably extended through the pair of holes 32a,b. For example, one end of the tube 62 preferably protrudes from hole 32a and the other end of the tube 62 preferably protrudes from hole 32b. The tube assembly 20 is then released and the pivot tube 62 restrains the cap 22 end of the tube assembly 20 within the bucket 52 such that the tube assembly 20 is capable of pivoting with respect to the bucket 52, while the flange 24 end extends below the bucket 52.

While in the regular striker configuration (FIG. 10) bucket 52 is preferably suspended, for example from the handle 54 (FIG. 7), and filled with animal feed. The feed is preferably precluded by the cap 22 from filling the passage 16 (FIG. 1) of the tube assembly 20, but some of the feed is capable of flowing out of the hole 60 (see also FIG. 8) in the bottom of the bucket 52 because the diameter of the hole 60 is slightly larger than the diameter of the tube 21 which is extending through the hole 60. An animal (such as a deer) can tap at the tube assembly 20 to cause the tube assembly 20 to pivot with respect to the bucket 52, which pivoting tends to cause feed to fall out of the hole 60 in the bottom of the bucket 52.

Referring also to FIG. 6, in accordance with a second alternate embodiment of the present invention, an extended striker configuration is achieved, for example, by threadedly attaching the top end 38 of the extension tube 36 to the flange end 24 of the tube assembly 20 while the tube assembly 20 is in the striker configuration (FIG. 10). The extended striker configuration is employed, for example, when feeding unruly animals such as hogs that have a tendency to gnaw at the bucket 52 when it is relatively accessible to them in the regular striker configuration.

While certain of the preferred and alternate embodiments of the present invention have been disclosed herein, other embodiments of the apparatus and methods of the present invention will suggest themselves to persons skilled in the art in view of this disclosure. Therefore, it will be understood that variations and modifications can be effected within the spirit and scope of the invention and that the scope of the present invention should only be limited by the claims below. Additionally, while it is intended that the scope of the present invention also include various alternate embodiments, it should be understood that each of the embodiments disclosed herein, including the preferred embodiments, include features and characteristics which are considered independently inventive. Accordingly, the disclosure of variations and alterations expressed in alternate embodiments is intended only to reflect on the breadth of the scope of the present invention without suggesting that any of the specific features and characteristics of the preferred embodiment are in any way obvious or unimportant.

I claim:

1. An apparatus for distributing feed from a reservoir of feed, the apparatus comprising:

a tube including
   a tube first end
   a tube second end, wherein the elongated axis of said tube extends between said tube first end and said tube second end, and
   a tube wall
      wherein said tube wall encircles and defines a passage internal to said tube,
      wherein said tube wall further defines a pair of opposed apertures therethrough proximate to said tube first end, said pair of opposed apertures being in communication with said passage, and
      wherein said tube wall further defines a third aperture therethrough proximate to said tube first end, said third passage being in communication with said passage; and a tubular threaded fitting connected to said tube second end, said threaded fitting including
   a radially extending, annular flange, and
   an annularly threaded surface internal to said threaded fitting.

2. An apparatus for distributing feed from a reservoir of feed, the apparatus comprising:

a tube including,
 a tube first end,
 a tube second end, wherein the elongated axis of said tube extends between said tube first end and said tube second end, and
 a tube wall,
  wherein said tube wall encircles and defines a passage internal to said tube,
  wherein said tube wall further defines a pair of opposed apertures therethrough proximate to said tube first end, said pair of opposed apertures being in communication with said passage, and
  wherein said tube wall further defines a third aperture therethrough proximate to said tube first end, said third passage being in communication with said passage;
a tubular threaded fitting connected to said tube second end, said threaded fitting including,
 a radially extending, annular flange, and
 an annularly threaded surface; and
a tubular expansion fitting interposed between said tube second end and said threaded fitting.

3. A feeder for distributing feed, the feeder comprising:

a feed reservoir including a lower panel,
 wherein said panel defines a hole therethrough, said panel defining a hole diameter of said hole, and
 wherein said feed reservoir defines a chamber above and in communication with said hole, wherein the feed is disposed within said chamber;
a tube assembly including a tube, said tube including,
 a tube first end, wherein said tube first end defines a rod diameter that is less than said hole diameter,
 a tube second end, wherein the elongated axis of said tube extends between said tube first end and said tube second end,
 a tube wall,
  wherein said tube wall encircles and defines a passage internal to said tube,
  wherein said passage is accessible at said tube second end, and
  wherein said tube wall defines a plurality of apertures therethrough proximate to said tube first end, said plurality of apertures being in communication with said passage, and
 a radially extending, annular flange connected to said tube second end,
  wherein said annular flange is disposed within said chamber,
  wherein said annular flange defines a diameter greater than said hole diameter, and
  wherein said annular flange abuts said panel of said feed reservoir,
 whereby feed flows from said feed reservoir into said passage and is accessible at said plurality of apertures; and
an elongated member connected to said rod first end, said elongated member including opposite ends extending generally perpendicularly from said rod first end, and said elongated member defining a length between said opposite ends, wherein said length is greater than said hole diameter,
wherein the feeder is constructed and arranged such that said tube assembly is capable of being readily inverted with respect to said feed reservoir to define a second configuration, wherein in said second configuration
 said tube first end is disposed within said chamber and extends through said hole,
 said tube second end is disposed below said hole, and
 said opposite ends of said elongated member abut said panel to pivotally connect said tube assembly to said feed reservoir,
whereby said elongated member pivotally suspends said tube assembly from said feed reservoir such that feed falls from said hole when said rod assembly is pivoted.

4. The feeder of claim 3, further comprising a tubular threaded fitting connected to said tube second end, wherein said threaded includes said annular flange.

5. The feeder of claim 4, further comprising an extension connected to and extending from said threaded fitting.

6. The feeder of claim 3, further comprising a body connected to said tube first end and partially occluding said passage at said tube first end, said body defining an aperture therethrough, said aperture providing fluid communication between said passage and the environment exterior to said tube first end.

7. The feeder of claim 3, further comprising a cap covering said tube first end, wherein said cap defines an aperture therethrough, said aperture providing fluid communication between said passage and the environment exterior to said tube first end.

8. The feeder of claim 3, wherein said tube wall further defines a second pair of opposed apertures therethrough proximate to said tube first end, said second pair of opposed apertures being in communication with said passage.

* * * * *